US010329990B2

(12) United States Patent
Cozza et al.

(10) Patent No.: US 10,329,990 B2
(45) Date of Patent: Jun. 25, 2019

(54) ASYMMETRIC CATALYST CONE FOR SWIRL INDUCTION OF EXHAUST GAS FLOW

(71) Applicant: GM GLOBAL TECHNOLOGY OPERATIONS LLC, Detroit, MI (US)

(72) Inventors: Ivan Flaminio Cozza, Turin (IT); Claudio Ciaravino, Turin (IT); Andrea Arnone, Turin (IT)

(73) Assignee: GM Global Technology Operations LLC., Detroit, MI (US)

( * ) Notice: Subject to any disclaimer, the term of this patent is extended or adjusted under 35 U.S.C. 154(b) by 74 days.

(21) Appl. No.: 15/668,754

(22) Filed: Aug. 4, 2017

(65) Prior Publication Data
US 2019/0040786 A1 Feb. 7, 2019

(51) Int. Cl.
*F01N 13/08* (2010.01)
*F01N 13/00* (2010.01)
*F01N 3/035* (2006.01)
*F01N 3/08* (2006.01)
*F01N 3/20* (2006.01)
*F01N 3/28* (2006.01)
*B01D 53/94* (2006.01)

(52) U.S. Cl.
CPC ........... *F01N 13/08* (2013.01); *B01D 53/944* (2013.01); *B01D 53/9418* (2013.01); *F01N 3/035* (2013.01); *F01N 3/0814* (2013.01); *F01N 3/0842* (2013.01); *F01N 3/2066* (2013.01); *F01N 3/2892* (2013.01); *F01N 13/009* (2014.06); *B01D 2255/1021* (2013.01); *B01D 2255/1023* (2013.01); *F01N 2240/20* (2013.01); *F01N 2610/02* (2013.01)

(58) Field of Classification Search
CPC ...... F01N 3/035; F01N 3/2066; F01N 3/2892; F01N 2240/20; F01N 2610/02
See application file for complete search history.

(56) References Cited

U.S. PATENT DOCUMENTS

| 2011/0308234 A1* | 12/2011 | De Rudder | B01F 3/04049 60/295 |
| 2012/0151902 A1* | 6/2012 | Yi | F01N 3/2066 60/301 |
| 2015/0377104 A1* | 12/2015 | Mueller-Haas | F01N 3/2066 60/295 |
| 2016/0326931 A1* | 11/2016 | Freeman | F01N 3/2066 |
| 2017/0002713 A1* | 1/2017 | Balenovic | F01N 3/2892 |

* cited by examiner

*Primary Examiner* — Audrey K Bradley
(74) *Attorney, Agent, or Firm* — Quinn IP Law

(57) ABSTRACT

An exhaust gas flow after-treatment (AT) system includes first and second AT devices. The first AT device includes cone with an inlet defined by a surface area having a first geometric center and an outlet defined by a surface area having a second geometric center. The AT system also includes an exhaust passage for carrying the exhaust gas flow from the first AT device cone outlet to the second AT device, and includes an injector for introducing a reductant into the exhaust gas flow within the exhaust passage. The first geometric center is arranged at a predetermined distance from the second geometric center and the inlet surface area is greater than the outlet surface area by a predetermined ratio. The predetermined distance and the predetermined ratio are together configured to induce swirl in and mix the reductant with the exhaust gas flow within the exhaust passage.

20 Claims, 3 Drawing Sheets

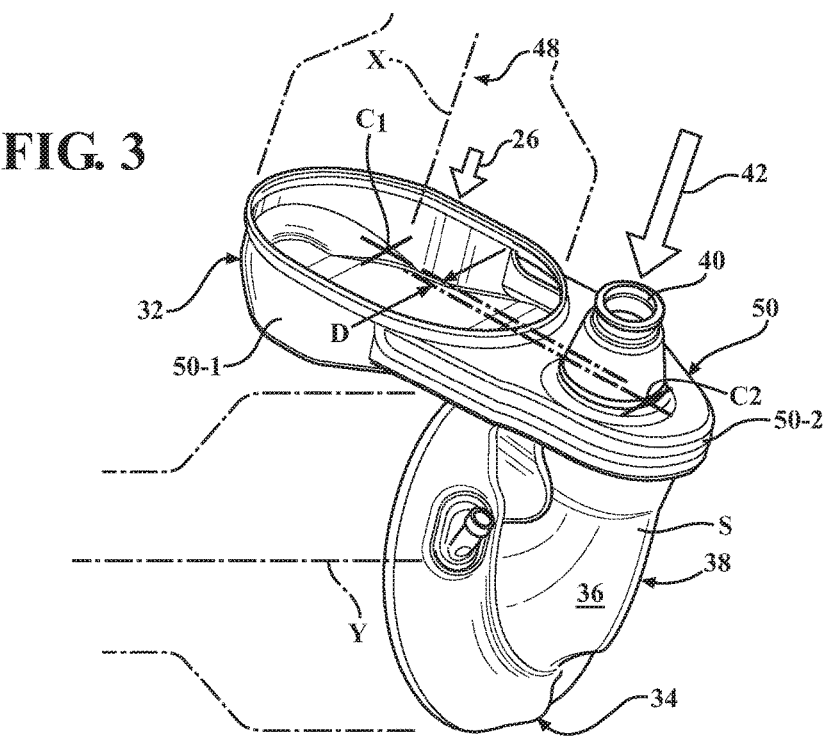
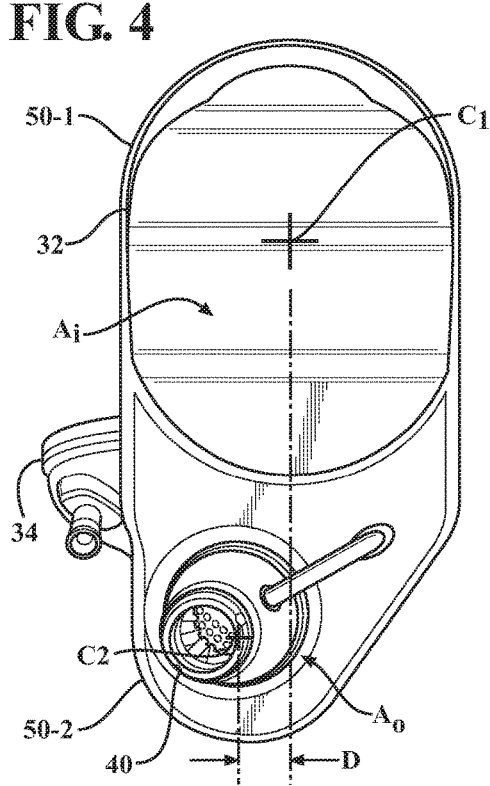
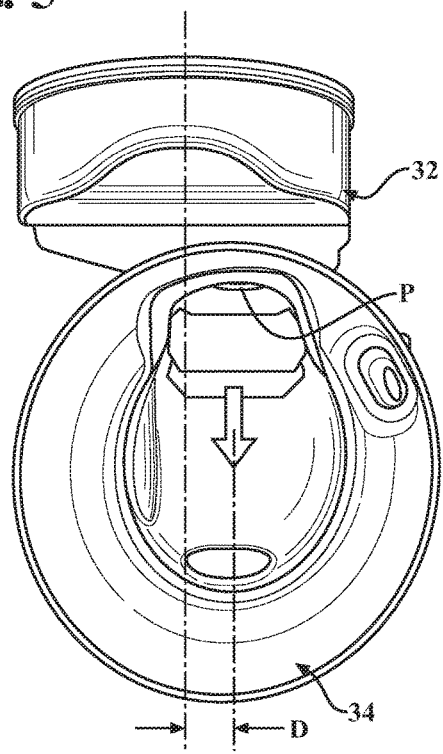
FIG. 3
FIG. 4
FIG. 5

ASYMMETRIC CATALYST CONE FOR SWIRL INDUCTION OF EXHAUST GAS FLOW

INTRODUCTION

The present disclosure is drawn to an asymmetric catalyst cone for swirl induction of exhaust gas flow in an exhaust gas after-treatment (AT) system employed by an internal combustion engine.

Various exhaust after-treatment (AT) devices, such as particulate filters and other devices, have been developed to effectively limit exhaust emissions from internal combustion engines. One of the exhaust after-treatment devices frequently used in a modern lean burn internal combustion engine, such as a compression-ignition or diesel type, is a selective catalytic reduction (SCR) catalyst.

The SCR is configured to convert nitrogen oxides ($NO_X$) into diatomic nitrogen ($N_2$) and water ($H_2O$) with the aid of the $NO_2$ generated by another exhaust after-treatment device, typically the diesel oxidation catalyst (DOC). For effective removal of $NO_X$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) into the exhaust gas flow, when the reductant is employed in diesel engines. Such a reductant may be an aqueous solution of urea that includes water and ammonia.

SUMMARY

An after-treatment (AT) system for an exhaust gas flow from an internal combustion engine includes first and second AT devices positioned in the exhaust gas flow. The first AT device includes a first AT device cone having a cone inlet defined by an inlet surface area having a first geometric center and a cone outlet defined by an outlet surface area having a second geometric center. The second AT device is positioned in the flow of exhaust gas downstream of the first AT device. The AT system also includes an exhaust passage configured to carry the flow of exhaust gas from the cone outlet of the first AT device cone to the second AT device, and includes an injector configured to introduce a reductant into the flow of exhaust gas carried by the exhaust passage to thereby reduce concentration of a pollutant. The first geometric center is arranged at a predetermined distance from the second geometric center and the inlet surface area is greater than the outlet surface area by a predetermined ratio. The predetermined distance and the predetermined ratio are together configured to induce swirl in the flow of exhaust gas and mix the introduced reductant with the flow of exhaust gas carried by the exhaust passage.

The predetermined distance may be equal to or greater than 8 mm.

The predetermined ratio may be equal to or greater than 3.5:1.

The exhaust passage may have a tapered shape defining a path for the flow of mixed exhaust gas and the reductant to the second AT device.

The exhaust passage may be characterized by an absence of a dedicated individual device, i.e., a mixer, configured to mix or blend the reductant with the flow of exhaust gas upstream of the second AT device.

The first AT device may be encased within a first housing, the second AT device may be encased within a second housing, and the exhaust passage may be defined by a transfer pipe connecting the first and second housings. In such an embodiment the first housing, the second housing, and the transfer pipe may be joined in a unitary assembly.

The injector may be arranged in the transfer pipe.

The first AT device may be arranged along a first axis, the second AT device may be arranged along a second axis, and the first axis may be substantially transverse to the second axis.

As disclosed, the internal combustion engine may be a compression-ignition engine, the reductant may be a diesel-exhaust-fluid (DEF) having an aqueous solution of urea, and the pollutant may be nitrogen oxide ($NO_X$).

The first AT device may be either a diesel oxidation catalyst (DOC) or a lean $NO_X$ trap (LNT). The second AT device may be a dual-function substrate including a selective catalytic reduction (SCR) catalyst and a diesel particulate filter (DPF).

A vehicle employing the above-described AT system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic perspective partial cut-away view of the AT system shown in FIGS. 1 and 2, illustrating a relative arrangement of geometric centers of the cone inlet and the cone outlet of the first AT device.

FIG. 4 is a schematic partial cut-away view of the AT system shown in FIGS. 1 and 2, viewed from the perspective of the first AT device, and illustrating the relative arrangement of geometric centers of the cone inlet and the cone outlet of the first AT device.

FIG. 5 is a schematic partial cut-away view of the AT system shown in FIGS. 1 and 2, viewed from the perspective of the second AT device, and illustrating the relative arrangement of geometric centers of the cone inlet and the cone outlet of the first AT device.

DETAILED DESCRIPTION

Figure 1:
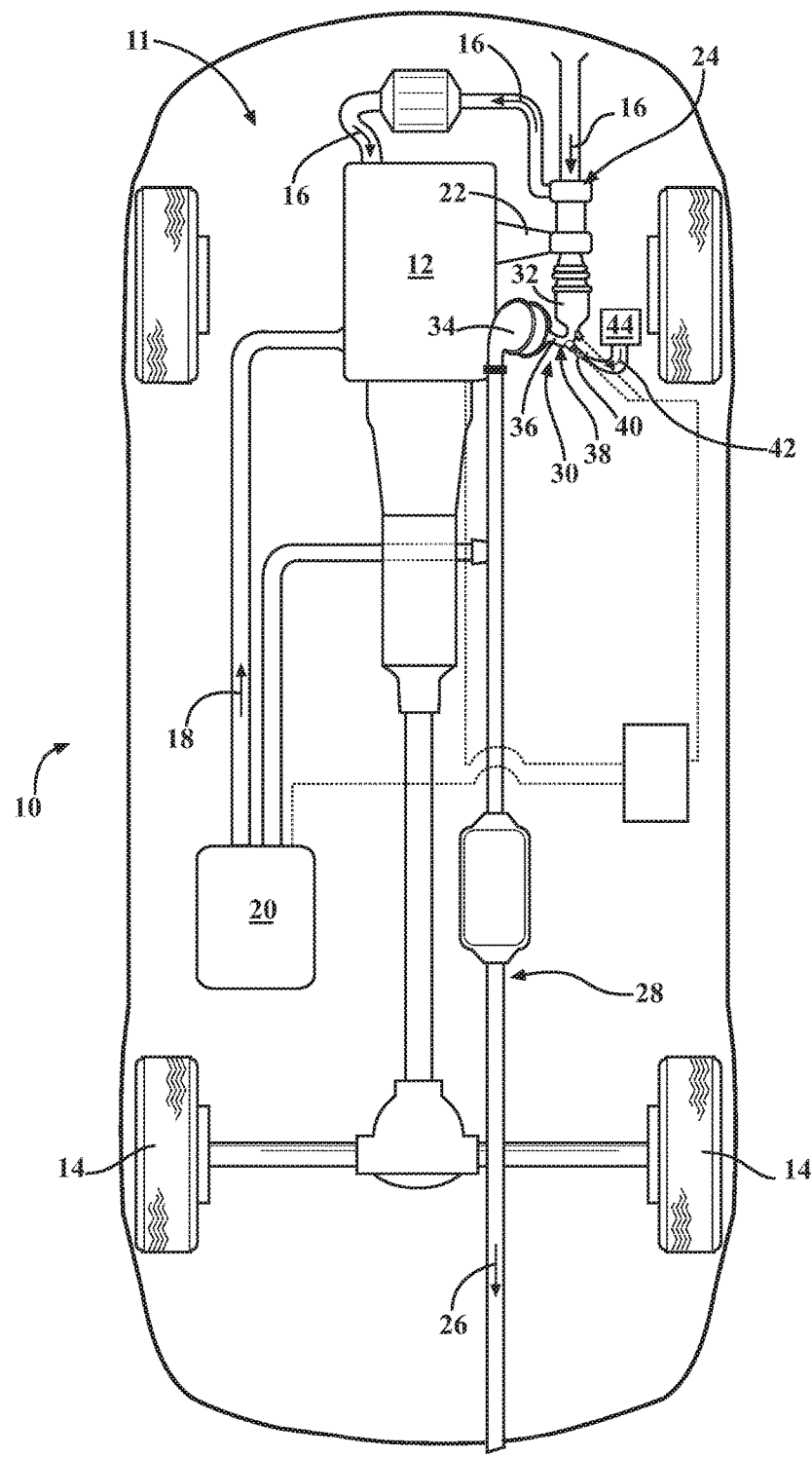
FIG. 1 is a schematic plan view of a vehicle having an internal combustion engine connected to an exhaust system having an after-treatment (AT) system with first and second close-coupled AT devices for reducing exhaust emissions.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, specific reference throughout the ensuing disclosure will be made to a compression-ignition or diesel type of an engine. As understood by those skilled in the art, internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by a flow of exhaust gas, specifically the exhaust gas flow 26 released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

Figure 2:
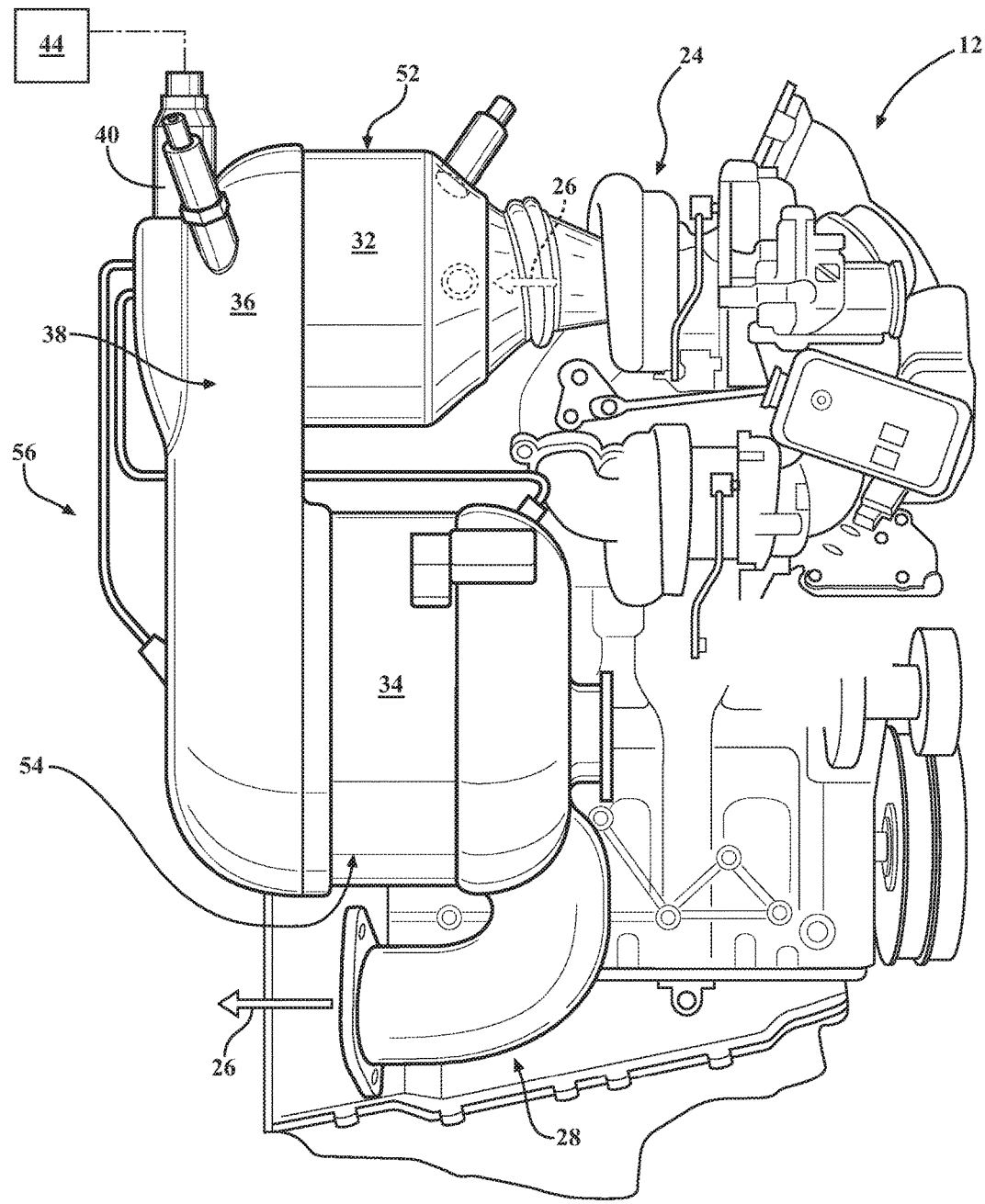
FIG. 2 is a schematic illustration of the internal combustion engine connected to the exhaust system with the after-treatment (AT) system shown in FIG. 1, specifically illustrating the first AT device having a cone inlet defined by an inlet surface area and a cone outlet defined by an outlet surface area.

The vehicle 10 also includes an engine exhaust after-treatment (AT) system 30. The AT system 30 includes a number of exhaust after-treatment devices configured to methodically remove pollutants such as largely carbonaceous particulate byproducts and emission constituents of engine combustion from the exhaust gas flow 26. As shown in FIGS. 1 and 2, the AT system 30 operates as part of the exhaust system 28. The AT system 30 includes a first AT device 32 close-coupled to the engine 12, such as at the exhaust manifold 22 or at the turbocharger 24, and a second AT device 34 positioned in the exhaust gas flow 26 downstream and close-coupled to the first AT device. As employed herein, the term "close-coupled" with respect to the arrangement of the first and second AT devices 32, 34 denotes each of the subject devices being in close proximity to each other and arranged inside an engine compartment 11 of the vehicle 10 for close proximity to the engine 12.

The close-coupled arrangement of the first and second AT devices 32, 34 reduces length of the exhaust passage (to be described in detail below) for transferring the exhaust gas flow 26 from the first AT device 32 to the second AT device 34. Consequently, such close-coupling of the first and second AT devices 32, 34 to the engine 12 provides a compact packaging arrangement that minimizes time for activation, i.e., light-off, of the AT system 30 in after-treatment of the exhaust gas flow 26 following a cold-start of the engine 12. As shown, the first AT device 32 may be a diesel oxidation catalyst (DOC) or a lean nitrogen oxide ($NO_X$) trap (LNT), while the second AT device 34 may be a dual-function substrate including a selective catalytic reduction (SCR) catalyst or an SCR on filter (SCRF) and a diesel particulate filter (DPF).

The primary function of the DOC is reduction of carbon monoxides (CO) and non-methane hydrocarbons (NMHC). When present, the DOC is additionally configured to generate nitrogen dioxide ($NO_2$), which may be used by the SCR arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIGS. 1 and 2, the DOC may be close-coupled to the turbocharger 24 in order to reduce loss of thermal energy from the exhaust gas flow 26 prior to the gas reaching the DOC.

The primary function of the LNT is to reduce oxides of nitrogen or $NO_X$ that are emitted by the engine 12 in the exhaust gas flow 26 as a byproduct of the reaction of nitrogen and oxygen gases in the air following a combustion event. The LNT removes $NO_X$ molecules from the exhaust gas flow 26 by adsorption, i.e., trapping and storing them internally during operation of the engine 12, thus acting like a molecular sponge. Typically, the LNT includes a ceramic substrate structure with a catalyzed wash-coat, i.e., mixed with an active precious metal, that is applied to channels of the substrate.

The primary function of the SCR is to convert nitrogen oxides ($NO_X$) into diatomic nitrogen ($N_2$) and water ($H_2O$), for example, with the aid of the $NO_2$ generated by the first AT device 32 configured as the DOC. The SCR may be configured as a 1-way filter, which filters particulate matter or soot, or a 2-way filter, which includes a catalyzed wash-coat, and carries two functions—filters particulate matter and reduces $NO_X$. For effective removal of $NO_X$, the SCR conversion process additionally requires a predetermined amount of ammonia ($NH_3$) to be present in the fuel-rich exhaust gas flow 26.

The primary function of the DPF is to collect and dispose of particulate matter emitted by the engine 12. The DPF acts as a trap for removing the particulate matter, specifically, soot, from the exhaust flow 26. Similar to the DOC described above, the DPF may contain precious metals, such as platinum and/or palladium, which would function as a catalyst to accomplish the noted objective. When used with an SCRF, however, such precious metals in the DPF could be removed.

As shown, the DOC or the LNT first AT device 32 is positioned upstream of the second AT device 34 including the SCR and DPF. The AT system 30 also includes an exhaust passage 36 configured to transfer or carry the flow of exhaust gas 26 from the first AT device 32 to the second AT device 34. The exhaust passage 36 may be defined by a transfer pipe 38 fluidly connecting the first and second AT devices 32, 34. As part of the AT system 30, an injector 40 is arranged downstream of the first AT device 32. The injector 40 is configured to generate a spray of a reductant 42 containing ammonia ($NH_3$), such as an aqueous solution of urea, a.k.a., diesel-exhaust-fluid (DEF), into the exhaust passage 36 for reducing via the second AT device 34 concentration of a particular pollutant, such as $NO_X$. As shown in FIG. 1, the injector 40 may receive the reductant 42 from a refillable reservoir 44.

The second AT device 34 is most effective in treating the flow of exhaust gas 26 when the flow of exhaust gas and the reductant 42 entering the second AT device substrate is a relatively homogenous mixture. Additionally, any induced swirling motion in the flow of the exhaust gas flow 26 containing the reductant may generate a more thorough coverage of the inlet to the second AT device 34, thus facilitating a more rapid light-off during cold-start of the engine 12 and a generally more efficient operation of the second AT device, and the AT system 30 overall.

As shown in FIGS. 2-5, the first AT device 32 includes an upstream cone 48 configured to receive the flow of exhaust gas 26 directly from the exhaust manifold 22 or from the turbocharger 24. The first AT device 32 also includes a downstream cone 50 configured to release the flow of exhaust gas 26 from the first AT device and direct the exhaust gas flow to the second AT device 34. The downstream cone 50 includes a cone inlet 50-1 defined by an inlet surface area $A_i$ having a first geometric center $C_1$. The downstream cone 50 of the first AT device 32 also includes a cone outlet 50-2 defined by an outlet surface area $A_o$ having a second geometric center $C_2$. Although not specifically shown, the second AT device 34 may also include upstream and downstream cones. The first geometric center $C_1$ is arranged at a predetermined distance D, i.e., displaced, from the second geometric center $C_2$. Additionally, the inlet surface area $A_i$ is greater than the outlet surface area $A_o$ by a predetermined factor or ratio R. The predetermined distance D and the predetermined ratio R are together configured to induce turbulence and swirl, i.e., a swirling motion, in the exhaust gas flow 26 upstream of the second AT device 34. Such swirling motion in the exhaust gas flow 26 is specifically intended to mix the introduced reductant 42 with the flow of exhaust gas 26 carried by the exhaust passage 36.

The above described predetermined distance D of the first geometric center $C_1$ from the second geometric center $C_2$ may be equal to or greater than 8 mm. Additionally, the predetermined ratio R may be equal to or greater than 3.5:1. As shown in FIG. 3, the exhaust passage 36 has a tapered shape S defining a path P for the flow of mixed exhaust gas 25 and the reductant 42 to the second AT device 34. Because the combination of the predetermined distance D and the predetermined ratio R are effective in inducing turbulence and swirl in the exhaust gas flow 26 upstream of the second AT device 34, the exhaust passage 36 may be characterized by an absence of a purposefully constructed mixer unit, i.e., a dedicated individual device configured to mix and or blend the reductant 42 with the flow of exhaust gas 26.

As shown in FIG. 3, the first AT device 32 may be arranged along a first axis X, to thus receive the flow of the exhaust gas 26, which is also directed along the first axis. The second AT device 34 is arranged along a second axis Y, in which case the flow of the exhaust gas 26 within the second AT device is also directed along the second axis. The first axis X may be arranged substantially transverse relative to the second axis Y, such that the first and second AT devices 32, 34 are positioned proximate to each other in a compact assembly, thus facilitating the above-described close-coupled arrangement of the first and second AT devices inside the engine compartment 11. The turbulence and swirl induced in the exhaust gas flow 26 upstream of the second AT device 34 by the combination of the predetermined distance D and the predetermined ratio R enables the first axis X to be arranged substantially transverse relative to the second axis Y without detrimentally impacting the flow of the mixed exhaust gas flow. As a result, the coverage of the inlet to second AT device 34 and the overall operational effectiveness of the close-coupled first and second AT devices 32, 34 is not degraded.

With resumed reference to FIG. 2, the first AT device 32 may be encased within a first housing 52, while the second AT device 34 may be encased within a second housing 54. The transfer pipe 38 is arranged between and connects the first and second housings 52, 54. As shown, the first housing 52, the second housing 54, and the transfer pipe 38 may be joined in a unitary assembly 56. In such a construction of the AT system 30, the injector 40 may be arranged in the transfer pipe 38. The transfer pipe 38 may also be a cast component, for example constructed from iron or steel, welded to the first and second housings 52, 54. Either embodiment of the transfer pipe 38 may be effective in facilitating the above-described arrangement of the first and second AT devices 32, 34 employing the disclosed combination of the predetermined distance D and the predetermined ratio R for mixing of the reductant 42 into and inducing turbulence and swirl in the exhaust gas flow 26.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An after-treatment (AT) system for a flow of exhaust gas from an internal combustion engine, the AT system comprising:
    a first AT device including a first AT device cone having:
        a cone inlet defined by an inlet surface area having a first geometric center; and
        a cone outlet defined by an outlet surface area having a second geometric center;
    a second AT device positioned in the flow of exhaust gas downstream of the first AT device and configured to reduce concentration of a pollutant;
    an exhaust passage configured to carry the flow of exhaust gas from the cone outlet of the first AT device cone to the second AT device; and
    an injector configured to introduce a reductant into the flow of exhaust gas carried by the exhaust passage;
    wherein:
        the first AT device cone has no plane of symmetry;
        the first geometric center is arranged at a predetermined distance from the second geometric center;
        the inlet surface area is greater than the outlet surface area by a predetermined ratio; and
        the predetermined distance and the predetermined ratio are together configured to induce swirl in the flow of exhaust gas and mix the introduced reductant with the flow of exhaust gas carried by the exhaust passage.

2. The AT system of claim 1, wherein the predetermined distance is equal to or greater than 8 mm.

3. The AT system of claim 1, wherein the predetermined ratio is equal to or greater than 3.5:1.

4. The AT system of claim 1, wherein the exhaust passage has a tapered shape defining a path for the flow of mixed exhaust gas and the reductant to the second AT device.

5. The AT system of claim 1, wherein the exhaust passage is characterized by an absence of a dedicated individual device configured to mix the reductant with the flow of exhaust gas upstream of the second AT device.

6. The AT system of claim 1, wherein:
    the first AT device is encased within a first housing and the second AT device is encased within a second housing;
    the exhaust passage is defined by a transfer pipe connecting the first and second housings;
    the injector is arranged in the transfer pipe; and
    the first housing, the second housing, and the transfer pipe are joined in a unitary assembly.

7. The AT system of claim 1, wherein the flow of exhaust gas is directed along a first axis, the first geometric center is arranged in a first plane, the second geometric center is arranged in a second plane, each of the first and second planes is arranged parallel to the first axis, and the second plane is parallel to and arranged at the predetermined distance from the first plane.

8. The AT system of claim 1, wherein the first AT device is arranged along a first axis, the second AT device is arranged along a second axis, and the first axis is transverse to the second axis.

9. The AT system of claim 1, wherein:
the internal combustion engine is a compression-ignition engine;
the reductant is a diesel-exhaust-fluid (DEF) having an aqueous solution of urea; and
the pollutant is nitrogen oxide ($NO_X$).

10. The AT system of claim 9, wherein:
the first AT device is one of a diesel oxidation catalyst (DOC) and a lean $NO_X$ trap (LNT); and
the second AT device is a dual-function substrate including a selective catalytic reduction (SCR) catalyst and a diesel particulate filter (DPF).

11. A vehicle comprising:
an internal combustion engine configured to generate a flow of exhaust gas as a byproduct of generating power; and
an exhaust system connected to the engine and having an after-treatment (AT) system for the flow of exhaust gas, the AT system including:
a first AT device including a first AT device cone having:
a cone inlet defined by an inlet surface area having a first geometric center; and
a cone outlet defined by an outlet surface area having a second geometric center;
a second AT device positioned in the flow of exhaust gas downstream of the first AT device and configured to reduce concentration of a pollutant;
an exhaust passage configured to carry the flow of exhaust gas from the cone outlet of the first AT device cone to the second AT device; and
an injector configured to introduce a reductant into the flow of exhaust gas carried by the exhaust passage;
wherein:
the first AT device cone has no plane of symmetry;
the first geometric center is arranged at a predetermined distance from the second geometric center;
the inlet surface area is greater than the outlet surface area by a predetermined ratio; and
the predetermined distance and the predetermined ratio are together configured to induce swirl in the flow of exhaust gas and mix the introduced reductant with the flow of exhaust gas carried by the exhaust passage.

12. The vehicle of claim 11, wherein the predetermined distance is equal to or greater than 8 mm.

13. The vehicle of claim 11, wherein the predetermined ratio is equal to or greater than 3.5:1.

14. The vehicle of claim 11, wherein the exhaust passage has a tapered shape defining a path for the flow of mixed exhaust gas and the reductant to the second AT device.

15. The vehicle of claim 11, wherein the exhaust passage is characterized by an absence of a dedicated individual device configured to mix the reductant with the flow of exhaust gas upstream of the second AT device.

16. The vehicle of claim 11, wherein:
the first AT device is encased within a first housing and the second AT device is encased within a second housing;
the exhaust passage is defined by a transfer pipe connecting the first and second housings;
the injector is arranged in the transfer pipe; and
the first housing, the second housing, and the transfer pipe are joined in a unitary assembly.

17. The vehicle of claim 16, wherein the flow of exhaust gas is directed along a first axis, the first geometric center is arranged in a first plane, the second geometric center is arranged in a second plane, each of the first and second planes is arranged parallel to the first axis, and the second plane is parallel to and arranged at the predetermined distance from the first plane.

18. The vehicle of claim 11, wherein the first AT device is arranged along a first axis, the second AT device is arranged along a second axis, and the first axis is transverse to the second axis.

19. The vehicle of claim 11, wherein:
the internal combustion engine is a compression-ignition engine;
the reductant is a diesel-exhaust-fluid (DEF) having an aqueous solution of urea; and
the pollutant is nitrogen oxide ($NO_X$).

20. The vehicle of claim 19, wherein:
the first AT device is one of a diesel oxidation catalyst (DOC) and a lean $NO_X$ trap (LNT); and
the second AT device is a dual-function substrate including a selective catalytic reduction (SCR) catalyst and a diesel particulate filter (DPF).

* * * * *